Oct. 16, 1928.

H. E. KEMPTON ET AL 1,687,981

METHOD OF AND APPARATUS FOR LOADING MACHINE TOOLS

Filed Dec. 15, 1923      3 Sheets-Sheet 1

Inventor
Herbert E. Kempton
Keith F. Gallimore
By Churchill Parker Railton Attys.

Oct. 16, 1928.
H. E. KEMPTON ET AL
1,687,981
METHOD OF AND APPARATUS FOR LOADING MACHINE TOOLS
Filed Dec. 15, 1923   3 Sheets-Sheet 2
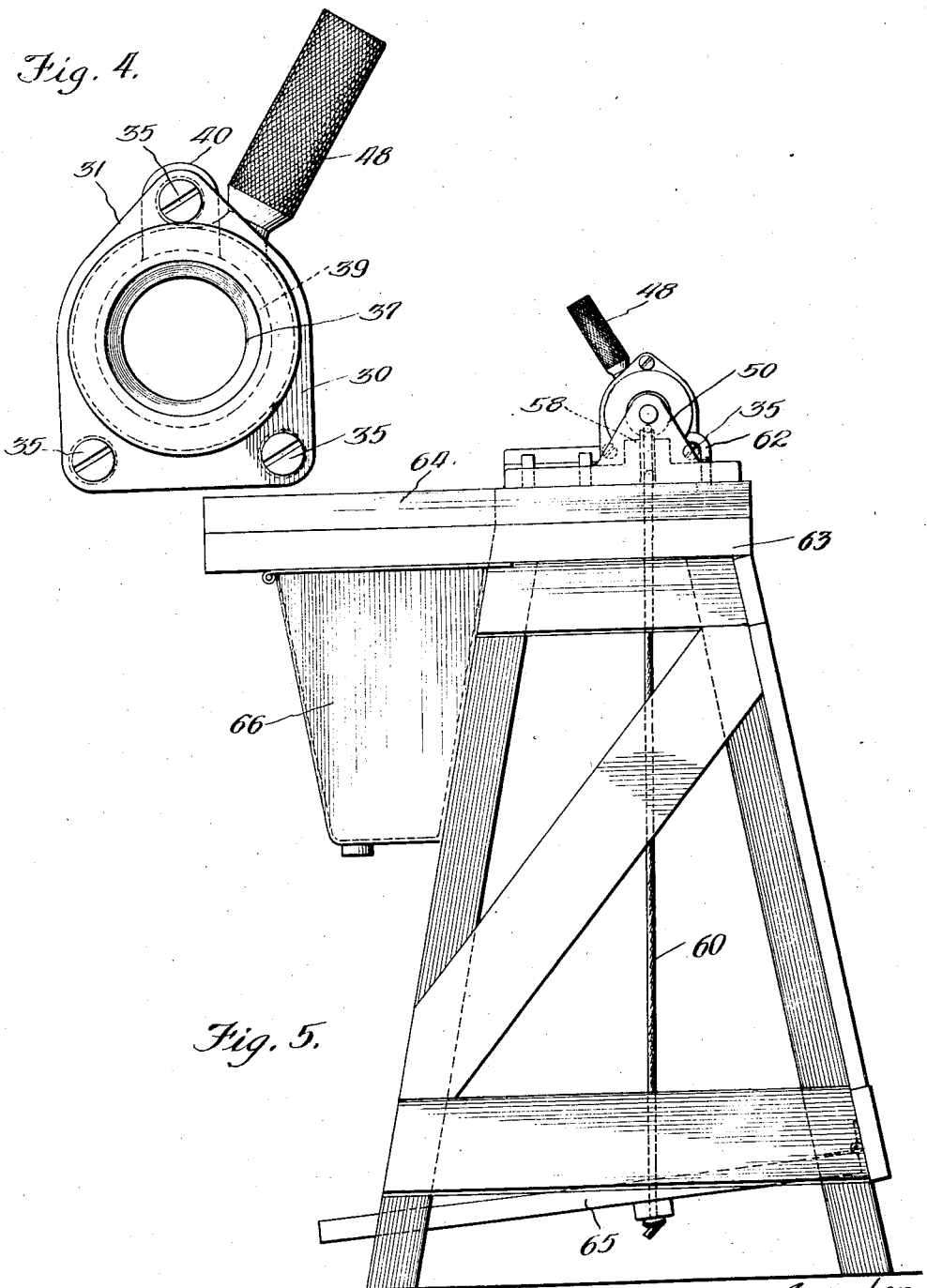

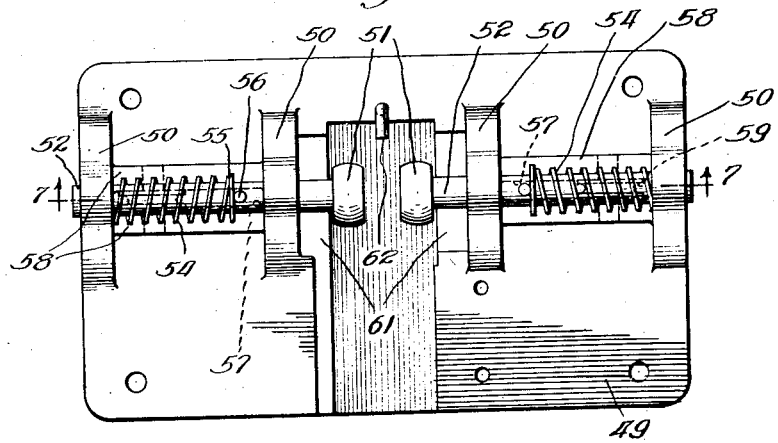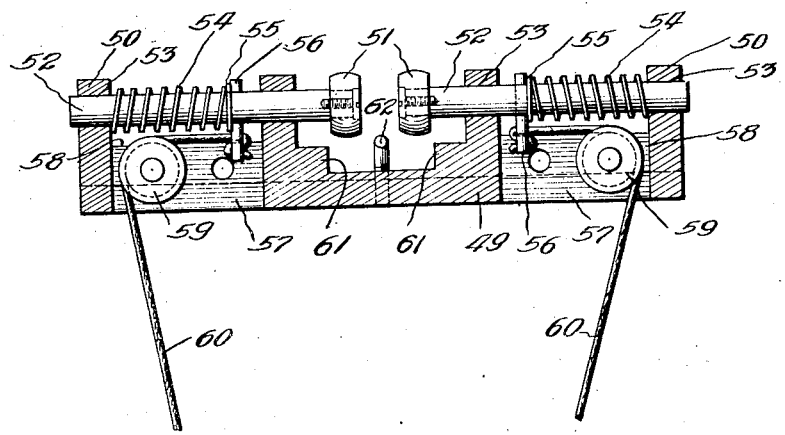

Patented Oct. 16, 1928.

1,687,981

UNITED STATES PATENT OFFICE.

HERBERT E. KEMPTON AND KEITH F. GALLIMORE, OF FOND DU LAC, WISCONSIN, ASSIGNORS, BY MESNE ASSIGNMENTS, TO THE HEALD MACHINE COMPANY, OF WORCESTER, MASSACHUSETTS, A CORPORATION OF MASSACHUSETTS.

METHOD OF AND APPARATUS FOR LOADING MACHINE TOOLS.

Application filed December 15, 1923. Serial No. 680,826.

This invention relates to a novel method of an apparatus for loading pieces of work in a machine tool chuck or work holding fixture where the work is to be subjected to a metal removing operation, and the invention refers more particularly to a method and apparatus of this character for loading annular or tubular pieces of work in the chuck of an internal grinding machine so as to grind the bores of the work.

It is the general object of the invention to provide a novel method and apparatus of this character which shall greatly increase the productive capacity and efficiency of the machine. This object is accomplished by minimizing the length of time for the loading operation so as to increase the actual productive working time of the machine; by loading in the machine and operating upon a plurality of pieces of work simultaneously; and by employing a plurality of shuttles adapted to be interchangeably secured in the machine chuck, each shuttle being constructed to clamp a plurality of work blanks, the finished work blanks being removed by the operator from the shuttle and new work blanks centered and clamped therein, while the machine is operating upon the blanks in the other shuttle fixed in the chuck. In this way the machine is operating continuously except for the brief intervals of time when a substitution of shuttles take place.

Another object of the invention is to produce a novel shuttle or work-clamping device arranged to clamp a plurality of pieces of work and being in turn adapted to be secured in the machine tool chuck.

A further object is to provide means to facilitate the reloading of the shuttle and the accurate centering of the pieces of work therein.

Another object is to provide a novel construction and cooperative relationship of work chuck and shuttle which permits of quickly substituting shuttles in the chuck and accurately centering them, and the invention also aims to provide a construction of this character which permits of the employment of a particular type of gaging device for automatically determining when the bores of the pieces of work have reached the precise size desired.

Further and ancillary objects of the invention and advantages flowing therefrom will be fully understood from a perusal of the following detailed description taken in connection with the accompanying drawings, in which Fig. 1 is a fragmentary view in vertical section through a portion of an internal grinding machine illustrating the application of our invention thereto.

Fig. 4 is an end view of the shuttle.

Fig. 5 is an end elevation of a device for facilitating the reloading of the shuttle and for centering the work blanks therein.

Fig. 6 is a plan view of the device shown in Fig. 5.

Fig. 7 is a vertical section taken along line 7—7 of Fig. 6.

Figure 1:
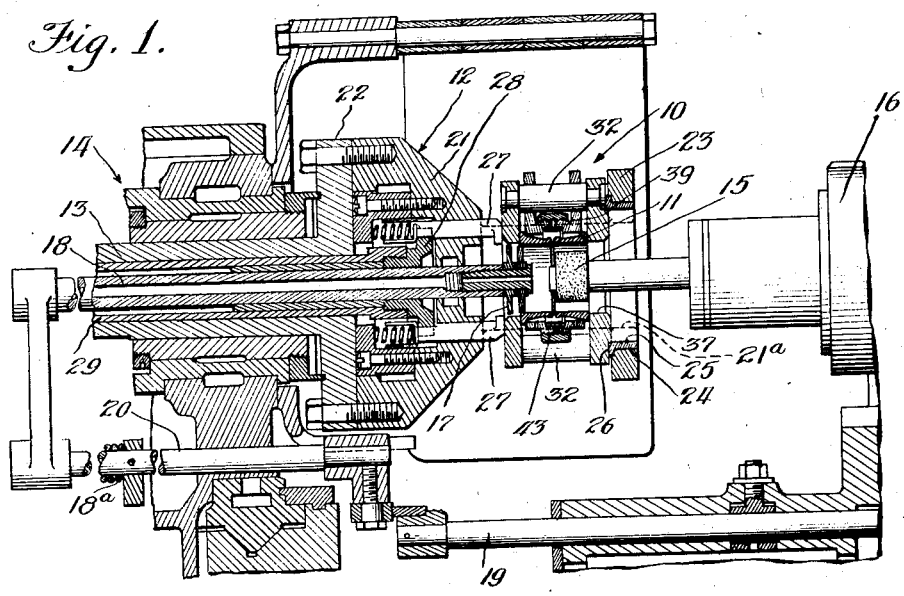

While our invention is susceptible of various modifications and alternative constructions, and may be used in connection with a large variety of machine tools, we have illustrated in the drawings and will herein describe in detail the preferred embodment as applied to an internal grinder, but it should be understood that we do not thereby intend to limit the invention to such specific construction or application, but aim in the subjoined claims to cover all legitimate modifications, alternative constructions, and uses falling within the scope of the invention.

Referring to the drawings, Figure 1 illustrates a portion of an internal grinding machine in which a shuttle 10 containing a pair of work blanks 11 is centrally clamped within a chuck 12 which is mounted on a spindle 13 journalled in the headstock 14. A grinding wheel 15 is mounted on a spindle in a carriage 16 and is associated with the chuck 12 for reciprocation through the internal bores of the work blanks. A gage member 17 is mounted for axial movement within the chuck 12 on the forward end of a reciprocable gage rod 18 extending through the spindle 13. A spring 18ª associated with the gage rod 18 regularly moves the gage member 17 into resilient engagement with the innermost work blank to gage the size of the bore. The gage member 17 is periodically withdrawn from the blank at each advance of the grinding element 15 by a push rod 19 carried by the spindle carriage 16 and arranged to regularly engage the forward end of a slide rod 20 operatively connected to the gage rod 18.

The chuck 12 comprises a cylindrical body 21 which is secured to a flange 22 formed on the forward end of the spindle 13. The body has at diametrically opposite sides a pair of rigid forwardly extending arms 21ª which are bridged at their forward ends by a front plate 23 having a central opening 24 concentric with the axis of the chuck. A hardened metal bushing 25 having a radial flange 26 at its inner end is firmly secured within the opening 24. A plurality of parallel spring pressed clamping pins 27 extend through the body 21, and are uniformly spaced from each other at equal distances about the axis of rotation. The clamping pins 27 are adapted to clamp the object to be chucked against the flange 26, and are operatively associated with a disk 28 positioned within the body 21. This disk 28 is rigidly secured to the forward end of a drawbar 29 which extends slidably through the spindle 13 and is manually operable, whereby the pins 27 may be simultaneously withdrawn to release the shuttle and permit removal thereof from the chuck.

Figure 2:
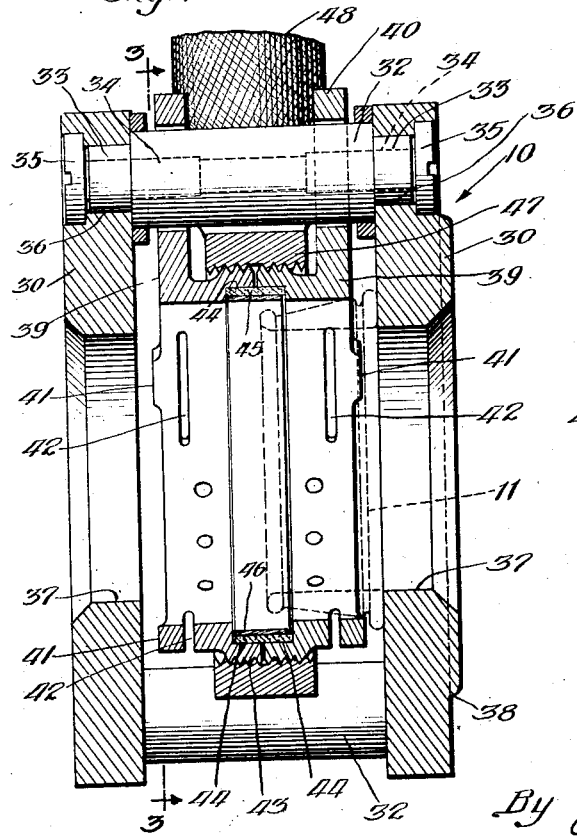
Fig. 2 is a vertical sectional view of the shuttle in open adjustment, one of the work blanks being indicated in dotted lines.
Figure 3:
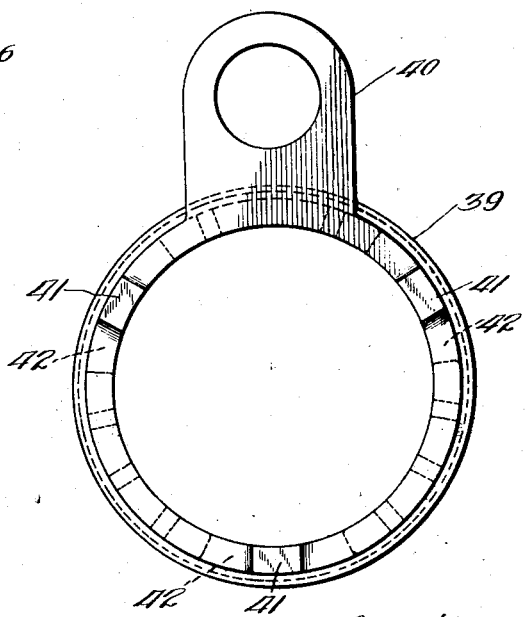
Fig. 3 is a side view taken along line 3—3 of Fig. 2 of one of the clamping rings in the shuttle.

The shuttle comprises a pair of end plates 30 (Figs. 2 and 4) which are preferably formed with V-shaped extensions 31 on their upper edges. A plurality of spacers 32 rigidly connect the upper and lower corners of the plates to hold them in parallel spaced relation. The spacers 32 are formed with reduced ends 33 which have longitudinally threaded bores 34 and are firmly secured by screw bolts 35 within apertures 36 extending through the end plates 30. Each end plate 30 is formed with a central opening 37. The front end plate 30 is formed with an annular centering notch 38 which is adapted to receive the flange 26 for the purpose of quickly and accurately centering the shuttle within the chuck with the openings 37 concentrically positioned relative to the axis of rotation.

The work blanks 11 are firmly clamped against the inner faces of the end plates 30 by a pair of clamping rings 39 which are centrally and loosely hung within the shuttle upon the upper spacer 32 by means of integral apertured ears 40. A plurality of uniformly spaced projections 41 are formed on the outer edges of the clamping rings 39 to engage the work blanks 11. To provide resiliency, the projections 41 are backed up by a plurality of elongated slots 42 formed in the peripheral walls of the clamping rings 39. The clamping rings 39 are provided with inwardly extending annular flanges 43 which have right and left hand screw threads formed on their respective peripheries. Annular notches 44 are formed in the inner adjacent edges of the flanges 43, and constitute a variable channel in which a packing ring 45 and a metallic ring 46 are loosely positioned to prevent the entrance of coolant and abrasive particles through the space between the flanges into the threads. An adjusting nut or ring 47 having right and left hand threads in opposite ends is mounted on the flanges 43, and is provided with a handle 48 whereby the clamping rings 39 may be simultaneously adjusted toward or from their respective end plates 30. The handle 48 also facilitates the insertion of the shuttle into the chuck.

Means is provided to facilitate reloading of the shuttles and for centering the work blanks 11 in a shuttle before the clamping rings 39 are tightened. In the present instance, I have provided a device comprising a base plate 49 (Figs. 6 and 7) which is formed with a plurality of upstanding projections 50 for supporting a pair of reciprocable centering plugs 51 movable toward and from each other. Preferably each of the centering plugs 51 is formed in the shape of a sphere segment having a maximum diameter substantially equal to that of the openings 37.

The centering plugs 51 are secured to the adjacent ends of a pair of alined rods 52, which are slidably mounted in openings 53 in the projections 50 on opposite ends of the base. A pair of coiled springs 54 which are positioned on the rods 52 resiliently press the plugs 51 toward each other. The springs 54 abut at their outer ends against the outer projections 50, and at their inner ends against washers 55 which are backed up by pins 56 extending through the rods 52.

An elongated slot 57 extends through the base plate 49 directly below each rod 52 and between the two supporting projections 50. The projections 50 on each end of the plate 49 are connected by a pair of spaced upstanding walls 58 which constitute a continuation of the sides of the slot 57. Mounted between the outer ends of each pair of walls 58, is a sheave 59. Flexible cords or cables 60 pass inwardly over the sheaves 59, and are connected to the lower ends of the pins 56 for moving the centering plugs 51 apart.

The central portion of the base plate 49 between the inner projections 50 is slightly raised, and is formed on opposite sides with a pair of parallel guides 61 which constitute the sides of a channel for positioning the shuttle 10 during the centering operation. A hook 62 secured to the plate 49 at the rear of the projections 50 extends forwardly over the channel to engage the rear spacer 32 when the shuttle 10 is in position.

Although any other suitable support may be employed, we have shown the base plate 49 of the centering device as mounted on a table 63, having a forwardly extending work shelf 64 (see Fig. 5). A treadle 65 is pivoted at its rear end to the lower portion of the table frame, and is centrally connected with the lower ends of the cords 60 to simultaneously actuate the centering plugs 51 by a downward movement of the treadle. Preferably, a receptacle 66 is secured to the table frame directly below the shelf 64. The receptacle 66 is adapted to contain a suitable lubricant in which the finished work blanks may be dipped after being removed from the shuttle 10 to clean the blanks and to facilitate the final manual gaging of the work blanks by the usual plug gage.

In operation, the handle 48 is moved into its upper position as seen in Fig. 4 to draw the clamping rings 39 into their open adjusted positions. The clamping rings are then revolved about the upper spacer 32 to a point beyond the end plates 30. Work blanks 11 are inserted into the outer ends of the clamping rings, and the latter are then oscillated back into their position between the end plates. The treadle 65 is now lowered to retract the centering plugs 51 of the centering device, after which the shuttle 10 is carefully positioned in the guides 61 between the inner projections 50. The treadle 65 is then released whereupon the springs 54 press the centering plugs 51 into the openings 37 and partially into the internal bores of the work blanks 11 to center the latter. With the work blanks 11 centered with respect to the openings 37, the handle 48 is lowered to separate the clamping rings 39 and force their extensions 41 into engagement with the work blanks to clamp the latter firmly against the inner faces of the end plates 30. When the work blanks have been clamped in place, the centering plugs 51 are drawn apart and the loaded shuttle 10 is removed.

After loading the shuttle 10, the clamping pins 27 of the chuck are retracted by means of the draw bar 29 and the shuttle 10 is inserted into the chuck and positioned with its annular notch 38 fitting tightly over the flange 26 of the centering bushing 25. The clamping pins 27 are then released and move to engage the rear end plate 30 to hold the shuttle firmly in place during the grinding operation. The grinding operation is continued until the gage member 17 succeeds in completely entering the internal bores of the work blanks 11, whereupon the cross feed is discontinued and the grinding element 15 is withdrawn into its inoperative position. After the grinding operation is completed, the shuttle is removed, another shuttle which was loaded during the above operation is positioned in the chuck, and the first shuttle is reloaded while the second is in the chuck, and so on.

It will be seen that we have provided means whereby the rate of production and efficiency in operation of machine tools is materially increased. By using a removable shuttle which is mounted in the chuck as the work pieces ordinarily are, a plurality of work pieces can be ground simultaneously instead of one. Considerable time is ordinarily lost in accurately centering the rough unfinished work blanks in the chuck. By mounting the unfinished work blanks in a removable chucking device which can be quickly and accurately positioned in the chuck without the aid of a centering device, the blanks can be accurately centered while the machine is in operation. The shuttle per se is simple and sturdy in construction and can be easily and quickly loaded with the aid of the centering device.

We claim as our invention:

1. A work holding device comprising, in combination, a frame having a pair of substantially alined openings, said frame being adapted to receive a plurality of work blanks, and a floating clamping means loosely mounted in said frame for clamping a work blank in position against each of said openings.

2. A work chucking device comprising, in combination, a hollow frame adapted to receive a plurality of work blanks, said frame being formed with a pilot for centering said device in a chuck, means for clamping the work blanks in axial alinement in said frame, an adjustable screw threaded means for actuating said last mentioned means.

3. An apparatus for loading grinding machines comprising, in combination, a removable shuttle comprising a pair of apertured end plates, means in said shuttle for clamping a pair of work blanks in centered positions against the inner faces of said end plates, and a side loading chuck comprising an apertured front plate for engaging one end of said shuttle, and a plurality of clamping members for engaging the other end of said shuttle to clamp the latter firmly in operative position, with the apertures in said end plates in alinement with the grinding element.

4. A chucking device comprising, in combination, a pair of parallel end plates having central openings extending therethrough, said openings being in register, a plurality of spacers engaging said plates for holding them firmly in spaced relation, a pair of clamping rings loosely mounted between said end plates for pivotal movement about one of said spacers and having inwardly extending flanges screw threaded on their outer peripheries, and an adjusting nut having right hand and left hand threads engaging said flanges for moving said rings toward and from each other.

5. A work chucking device having, in combination, a pair of spaced end plates having centrally positioned alined openings, spacers for connecting said end plates to hold them rigidly in parallel relation, a pair of clamping rings mounted for rotation about one of said spacers, said clamping rings having flanges adjacent each other, said flanges being threaded on their outer peripheries, an annular notch formed in the inner edge of each clamping flange, said notches cooperating to define a variable channel, means positioned within said channel for closing the space between the adjacent ends of said flanges, and an internally threaded adjusting ring engaging said flanges, for moving the said clamping rings toward or from each other to clamp the work blanks against the inner faces of the end plates.

6. A work chucking device having, in combination, a pair of end plates, means for holding said end plates firmly in parallel spaced relation, central alined apertures through said end plates, a pair of clamping rings loosely mounted between said end plates, and means for adjusting the relative position of said clamping rings to move them simultaneously toward or from the inner faces of the end plates.

7. A work chucking device comprising, in combination, a plate having a central opening, an annular centering notch formed in the outer face concentric with said opening, a work clamping ring mounted adjacent to said opening, and means for moving said ring toward and from said plate to clamp annular work blanks firmly against the inner face of said plate about said opening.

8. A work chucking device comprising, in combination, a frame having a pair of alined openings therein, a pair of ring shaped clamping members mounted in said frame adjacent to said openings, and an adjusting ring engaging said clamping members for moving the latter toward and from said openings.

9. A method of loading annular pieces of work into an internal grinder which comprises clamping a pair of annular pieces in axial alinement in a portable shuttle, mounting said shuttle in the rotatable work chuck of a grinder with the pieces in position concentric with the chuck so as to be internally operated upon by the grinding wheel, and while said pieces are being ground removing previously ground pieces from another shuttle, axially centering and clamping another pair of fresh pieces in the second shuttle, and finally substituting the second shuttle for the first shuttle in the rotatable chuck of the grinder when the grinding of the pieces in the first shuttle has been finished.

10. A method of loading grinding machines comprising inserting a plurality of work blanks into a chucking device, centering said work blanks, clamping said work blanks in position while centered, inserting said loaded device into a rotatable chuck, and clamping said device in a centered position in the chuck.

11. A method of loading machine tools comprising inserting, centering, and clamping a work blank in a removable shuttle, and inserting, positioning, and clamping said shuttle in a rotatable chuck.

12. A method of loading annular pieces of work into an internal grinding machine which comprises securing a plurality of said annular pieces in axial alinement in a work holder and then securing said work holder in the rotary chuck of the grinder in position for the pieces to be internally ground by the grinding wheel thereof.

13. A method of loading annular pieces of work into an internal grinder which comprises first centering a pair of said pieces in accurate axial alinement, then clamping the pair of pieces in such alined position in a portable shuttle, and then mounting said shuttle and contained pieces in the rotary chuck of the grinder in position for the pieces to be operated upon internally by the grinding wheel thereof.

14. In apparatus of the class described, the combination with a headstock, a rotary spindle journalled in said headstock, and chuck parts rotatively carried by said spindle, said chuck parts comprising centering means which rotate with the chuck as a unit, and engageable and disengageable clamping means which also rotate with said chuck as a unit, of a removable shuttle adapted to be clamped in said chuck, said shuttle comprising work clamping means, centering means adapted to fit exactly with the centering means of said chuck, and a surface adapted to be engaged by the clamping means in said chuck, the said shuttle as a whole being adapted to be held like a workpiece by said chuck, and when so clamped, rotating when the spindle rotates.

15. In apparatus of the class described, the combination with a headstock, a rotary spindle journalled in said headstock, and chuck parts carried by said spindle, said chuck parts comprising a face plate rotating with said chuck as a unit, centering means on the inside of said face plate, and engageable and disengageable clamping means which also rotate with said chuck as a unit, said chuck being therefore a side loading chuck, of a removable shuttle adapted to be clamped in said chuck, said shuttle comprising work clamping means, centering means adapted to fit exactly with the centering means of said chuck, and a surface adapted to be engaged by the clamping means in said chuck, the said shuttle as a whole being adapted to be held like a workpiece by said chuck, and when so clamped, rotating as the spindle rotates.

16. In a workholding device, the combination with a face plate, an annular clamping member adapted to press a workpiece against said face plate to clamp it there, means to exert pressure on said annular clamping member, a plurality of projections on said face plate to actually engage the work, and a plurality of slots in said annular clamping member behind said projections, to give resiliency to said clamping member and overcome slight inequalities in the workpiece.

In testimony whereof we have hereunto affixed our signatures.

HERBERT E. KEMPTON.
KEITH F. GALLIMORE.